United States Patent [19]

Kishi et al.

[11] Patent Number: 4,689,750
[45] Date of Patent: Aug. 25, 1987

[54] MACHINE TOOL METHOD FOR DECIDING IF A WORKPIECE SURFACE IS CONCAVE OR CONVEX

[75] Inventors: Hajimu Kishi; Kunio Tanaka, both of Tokyo, Japan

[73] Assignee: Fanuc Ltd, Minamitsuru, Japan

[21] Appl. No.: 752,076

[22] PCT Filed: Oct. 30, 1984

[86] PCT No.: PCT/JP84/00522

§ 371 Date: Jun. 25, 1985

§ 102(e) Date: Jun. 25, 1985

[87] PCT Pub. No.: WO85/01908

PCT Pub. Date: May 9, 1985

[30] Foreign Application Priority Data

Oct. 31, 1983 [JP] Japan .............................. 58-204573
Oct. 31, 1983 [JP] Japan .............................. 58-204574

[51] Int. Cl.$^4$ ........................................ B23Q 15/013
[52] U.S. Cl. ........................................ 364/474; 408/13
[58] Field of Search ............... 364/474, 475, 167, 168, 364/169; 318/571, 572; 408/8–13

[56] References Cited

U.S. PATENT DOCUMENTS 4,442,493  4/1984  Wakai et al. ........................ 408/11
4,503,493  3/1985  Burkhardt et al. ................... 408/12
4,597,040  6/1986  Buizer ............................. 408/12

*Primary Examiner*—Jerry Smith
*Assistant Examiner*—Allen MacDonald
*Attorney, Agent, or Firm*—Staas & Halsey

[57] ABSTRACT

A method of machining performed by back-and-forth cutting, particularly a machining method for automatically creating a pick-feed path that will not cause a tool (TL) to interfere with a workpiece (WK) when a pick-feed is performed, moving the tool along the pick-feed path, and thereafter performing cutting. If the workpiece is concave in the proximity of the pick-feed path, the method includes obtaining an approach plane (AP) containing a machining end point (Pe) and lying parallel to a plane (PL) which contacts a curve (OLC) of the external shape of the workpiece at a next machining starting point Ps. Then a point of intersection Pc between the approach plane (AP) and a straight line (SL) passing through the machining starting point Ps is obtained, with the straight line coinciding with the direction of the central axis of the tool at the machining starting point. The path Pe→Pc→Ps serves as the pick-feed path. If the workpiece is convex in the proximity of the pick-feed path, the method includes obtaining the approach plane (AP) contacting the curve (OLC) of the external shape of the workpiece at the next machining starting point Ps. Then the point of intersection Pc between the approach plane (AP) and a straight line (SL') passing through the machining end point Pe is obtained, with straight line coinciding with the direction of the central axis of the tool at the machining end point. The path Pe→Pc→Ps serves as the pick-feed path.

6 Claims, 8 Drawing Figures

MACHINE TOOL METHOD FOR DECIDING IF A WORKPIECE SURFACE IS CONCAVE OR CONVEX

BACKGROUND OF THE INVENTION

This invention relates to a machine tool machining method and, more particularly, to a machine tool machining method so adapted that a tool will not contact a workpiece when a pick-feed is performed.

As shown in FIG. 1, the numerically controlled machining of a curved surface is carried out by performing a first machining operation by moving a tool TL at a cutting velocity along a predetermined path PT1 on a workpiece WK in the direction of the arrow, pick feeding the tool from an end point Pe to a starting point Ps on the next machining path PT2 at the conclusion of machining along the above-mentioned path, performing a second machining operation by moving the tool in a cutting feed mode along the machining path PT2 in the direction of the arrow, and thereafter repeating the pick-feed and the first and second machining operations (referred to as back-and-forth cutting) to machine the curved surface. In such numerically controlled machining of a curved surface, machining is carried out while exercising control in such a manner that the central axis (the one-dot chain line in FIG. 1) of the tool TL is directed normal to the workpiece WK or oriented in a direction having a prescribed angle of inclination with respect to the direction of the normal line at all times. Consequently, the machine tool is arranged to rotate the tool while the tool is being moved along orthogonal axes in three dimensions, and to perform machining while the central axis of the tool is, e.g., brought into agreement with the direction of the normal line to the workpiece. NC data specifying the path include position data (position vectors) for specifying the position of the tool nose, and tool central axis direction data (positions along B and C axes or tool central axis vector) for specifying the direction of the tool central axis. Note that the B and C axis are vertical and horizontal axes of rotation.

In the machining of a curved surface by such back-and-forth cutting, the tool nose will strike the workpiece at high speed when the pick-feed is performed, thereby resulting in an erroneous cutting operation or in damage to the tool, unless an appropriate pick-feed path from the machining end point Pe on the first machining path PT1 to the machining starting point Ps on the second machining path PT2 is determined. To this end, when performing a pick-feed in the prior art, pick-feed paths are determined that will not bring the tool nose into contact with the workpiece, and each pick-feed path is programmed as NC data.

However, in the conventional method, a pick-feed path that will not cause a tool to interfere with a workpiece cannot be determined for any and all curved surfaces through a simple technique. As a result, creating the NC data can be a troublesome task. In addition, to insure that the tool will not interfere with the workpiece, with the conventional method the tool retraction stroke is enlarged and, hence, so is the pick-feed stroke. This is disadvantageous in that actual machining time is prolonged.

The foregoing drawbacks become even more pronounced especially when performing pick-feed while rotating the tool in the directions of the B and C axes. The reason is that even when the path of travel of the tool TL of a machine tool having axes of rotation is a straight line LN in three dimensions X, Y and Z, as shown in FIG. 2, the path traversed by the tool nose is unpredictable rather than linear, as indicated by the dashed line, when the tool is rotated in the directions of the B and C axes at the same time that it is moved along the straight line.

SUMMARY OF THE INVENTION

Accordingly, an object of the present invention is to provide a machine tool machining method whereby a pick-feed path that will not cause a tool to strike a workpiece when a pick-feed is performed, can be determined in a simple manner.

Another object of the present invention is to provide a machine tool machining method whereby NC data for back-and-forth cutting that will not cause a tool to strike a workpiece when a pick-feed is performed, can be created automatically and with ease.

Still another object of the present invention is to provide a machine tool machining method whereby a pick-feed command is inserted into an NC program in advance, a path that will not cause a tool to strike a workpiece is obtained automatically in response to the command, and the tool is moved along the pick-feed path obtained.

The present invention provides a method of machining performed by back-and-forth cutting, which method includes automatically creating a pick-feed path that will not cause a tool to strike a workpiece when a pick-feed is performed, moving the tool along the pick-feed path, and thereafter performing cutting.

For a workpiece which is concave in the proximity of the pick-feed path, an approach plane is obtained containing a machining end point Pe and lying parallel to a plane which contacts the curve of the external shape of the workpiece at a machining starting point Ps on the next machining path, and then a point of intersection Pc is obtained between the approach plane and a straight line passing through the machining starting point Ps, the straight line coinciding with the direction of the central axis of the tool at the machining starting point. The path Pe→Pc→Ps serves as the pick-feed path.

For a workpiece which is convex in the proximity of the pick-feed path, an approach plane is obtained contacting the curve of the external shape of the workpiece at a machining starting point Ps on the next machining path, and then a point of intersection Pc is obtained between the approach plane and a straight line passing through the machining end point Pe, the straight line coinciding with the direction of the central axis of the tool at the machining end point. The path Pe→Pc→Ps serves as the pick-feed path.

Accordingly, machining is performed by obtaining a pick-feed path following completion of cutting along a first path, thereafter moving the tool along the pick-feed path to position the tool at the next machining starting point Ps, and then moving the tool along the next cutting path.

According to this invention, a pick-feed path that will not cause the tool to strike the workpiece can be created automatically.

DETAILED DESCRIPTION OF THE PREFERRED EMBODIMENT

Figure 1:
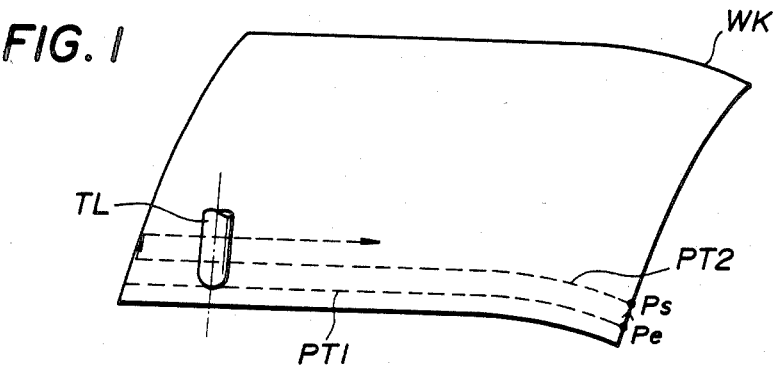
FIG. 1 is a diagram for describing a tool path for a case where a curved surface is machined by repeating pick-feed and back-and-forth cutting.
Figure 2:
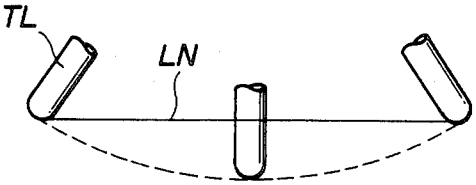
FIG. 2 is a diagram for describing the trajectory of a tool nose for a case where a machine tool includes axes of rotation.
Figure 3A:
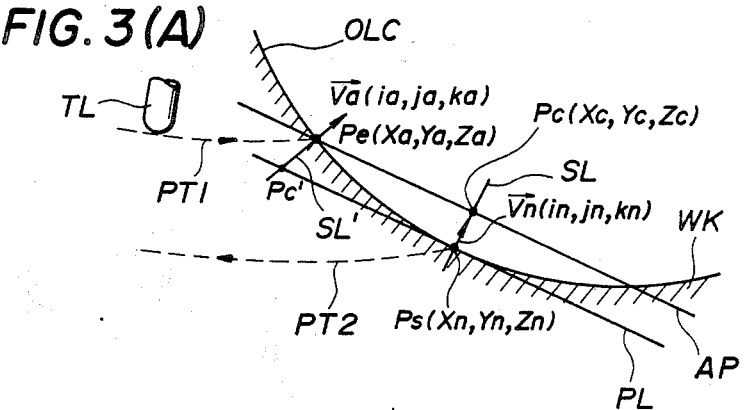
FIGS. 3(A), (B) are diagrams for describing the general features of the present invention for cases where the shape of a curved surface at a pick-feed portion is concave and convex, respectively.
Figure 3B:
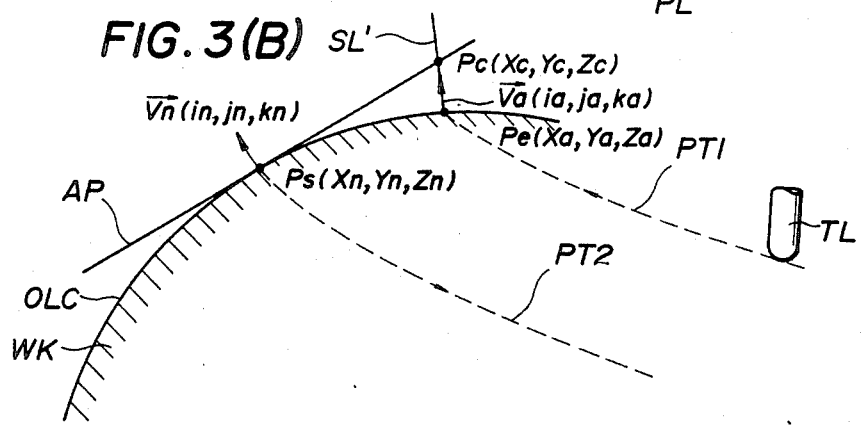

FIG. 3 are diagrams for describing the general features of the present invention, in which FIG. 3(A) is for a case where a curved surface of a workpiece is concave, and FIG. 3(B) is for a case where a curved surface of a workpiece is convex.

Desired machining is carried out by performing a first machining operation for moving a tool relative to a workpiece WK along a path PT1, thereafter pick feeding the tool from an end point Pe of the first machining path to a starting point Ps on the second machining path, performing a second machining operation after the pick-feed, for moving the tool relative to the workpiece along the second machining path PT2 in a direction opposite to that of the above-mentioned machining direction, and repeating these machining operations and the pick-feed operation.

The manner in which the pick-feed path is determined when the curved surface of the workpiece is concave will now be described. By making use of three-dimensional position data (Xn, Yn, Zn) indicative of the machining starting point Ps of the second machining path PT2, tool central axis direction data (in, jn, kn) at the machining starting point, and position data (Xa, Ya, Za) indicative of the machining end point Pe of the first machining path, an approach plane AP is obtained. The approach plane AP contains the machining end point Pe and lies parallel to a plane PL which contacts a curve OLC of the external shape of the workpiece at the machining starting point Ps. A point of intersection Pc is obtained between the approach plane AP and a straight line SL passing through the machining starting point Ps, the straight line SL coinciding with the direction of the central axis of the tool at the machining starting point. The path Pe→Pc→Ps serves as the pick-feed path.

The manner in which the pick-feed path is determined when the curved surface of the workpiece is convex will now be described. By making use of the three-dimensional position data (Xn, Yn, Zn) indicative of the machining starting point Ps of the second machining path PT2 and the toll central axis direction data (in, jn, kn) at the machining starting point, the approach plane AP is obtained contacting the curve OLC of the external shape of the workpiece at the machining starting point Ps. Then, by using three-dimensional position data (Xa, Ya, Za) indicative of the machining end point Pe of the first machining path PT1 and tool central axis direction data Va (ia, ja, ka) at the machining end point, the point of intersection Pc is obtained between the approach plane AP and a straight line SL' passing through the machining end point, the straight line SL' coinciding with the direction of the central axis of the tool. The path Pe→Pc→Ps serves as the pick-feed path.

Figure 4:
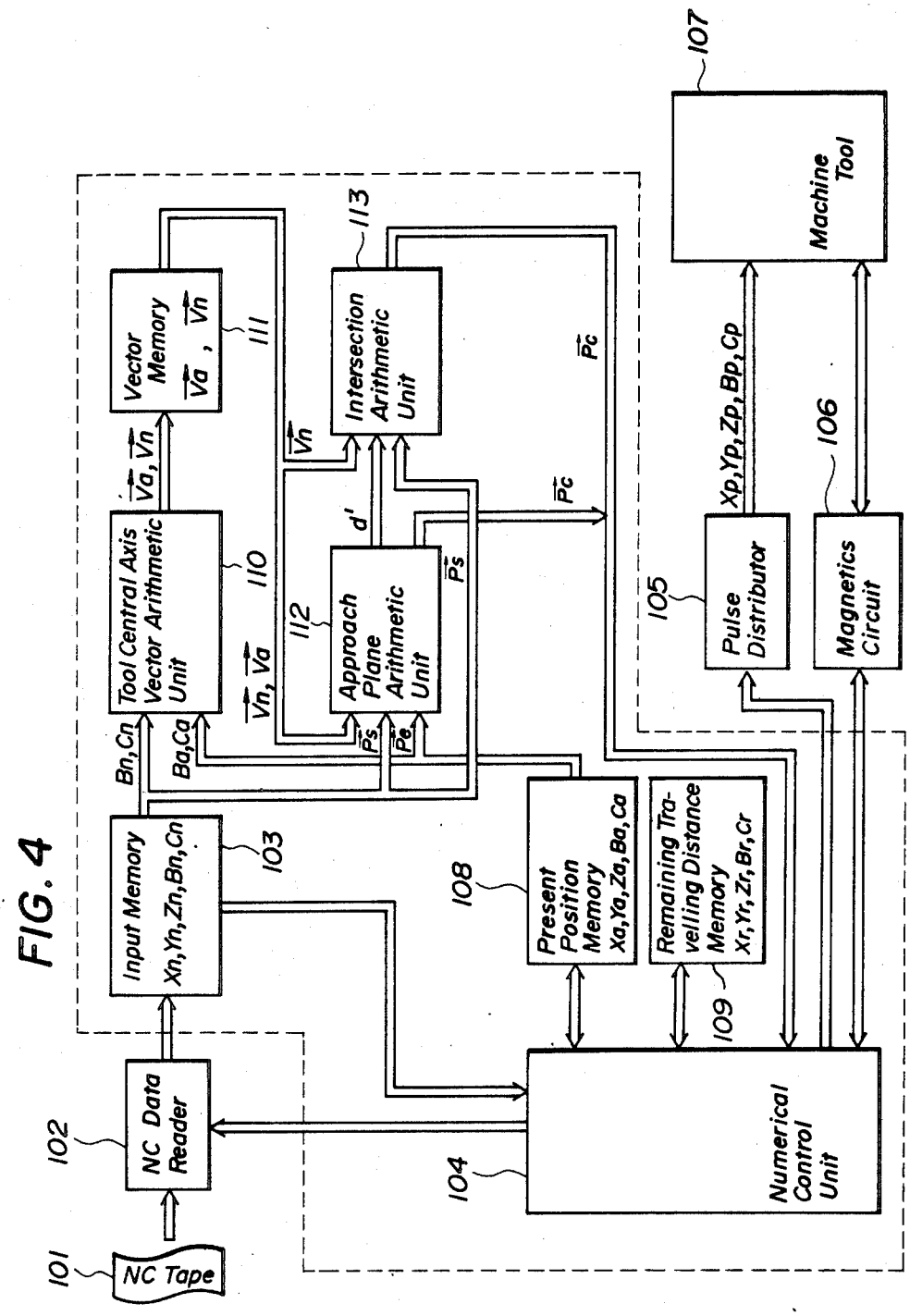
FIG. 4 is a block diagram of an embodiment of the present invention.

FIG. 4 is a block diagram of an embodiment of the present invention. An NC tape or memory (assumed to be an NC tape hereafter) 101 stores NC data. The NC data are so arranged that the tool TL is made to perform cutting in the direction of the arrow up to the end point Pe along the first machining path PT1 of FIG. 3. Next the tool TL is pick-fed from the end point Pe to the machining starting point Ps on the second machining path PT2. Then the tool TL is made to perform cutting in the direction of the arrow along the second machining path, and thereafter is made to repeat this back-and-forth cutting operation. Each of the paths PT1, PT2 is approximated by minute polygonal lines, and a pick-feed is indicated by an M-function instruction M□□ (where □□ is a two-digit numerical value). An NC data reader 102 reads the NC data from the NC tape 101 one block at a time and stores the data in an input memory 103. A numerical control unit 104 decodes the NC data stored in the input memory 103. If the NC data are path data, then these data are delivered to a pulse distributor 105. If an item of NC data is an M-, S- or T- function instruction to be delivered to the machine side, then the instruction is applied to a machine tool 107 through a magnetics circuit 106. If an item of data is a pick-feed instruction M□□, then the NC data reader 102 is made to read the next block of NC data (position data indicative of the starting point of the next machining path).

When an item of NC data is path data, the numerical control unit 104 finds incremental values Xi, Yi, Zi, Bi, Ci along the respective axes (rectangular coordinates axes X, Y, Z, vertical axis of rotation B and horizontal axis of rotation C). The numerical control unit 104 then uses a three-dimensional command velocity F and the incremental values Xi, Yi, Zi, Bi, Ci along the respective axes in three dimensions to obtain velocity components $F_x$, $F_y$, $F_z$, Fb, Fc along the respective axes from equations.

$$F_x = X_i \cdot F / \sqrt{X_i^2 + Y_i^2 + Z_i^2} \tag{1a}$$

$$F_y = Y_i \cdot F / \sqrt{X_i^2 + Y_i^2 + Z_i^2} \tag{1b}$$

$$F_z = Z_i \cdot F / \sqrt{X_i^2 + Y_i^2 + Z_i^2} \tag{1c}$$

$$F_b = B_i \cdot F / \sqrt{X_i^2 + Y_i^2 + Z_i^2} \tag{1d}$$

$$F_c = C_i \cdot F / \sqrt{X_i^2 + Y_i^2 + Z_i^2} \tag{1e}$$

and thereafter obtains travelling quantities ΔX, ΔY, ΔZ, ΔB, ΔC which are to be traversed along the respective axes in a predetermined period of time ΔT sec (=16 msec), from equations $$\Delta X = F_x \cdot \Delta T \tag{2a}$$

$$\Delta Y = F_y \cdot \Delta T \tag{2b}$$

$$\Delta Z = F_z \cdot \Delta T \tag{2c}$$

$$\Delta B = F_b \cdot \Delta T \tag{2d}$$

$$\Delta C = F_c \cdot \Delta T \tag{2e}$$

The numerical control unit delivers ΔX, ΔY, ΔZ, ΔB, ΔC to the pulse distributor 105 every ΔT sec. On the basis of the input data, the pulse distributor 105 performs a simultaneous five-axis pulse distribution calculation to generate distributed pulses Xp, Yp, Zp, Bp, Cp. These are delivered to servo circuits, (not shown), for the respective axes to transport the tool along the cutting path.

The numerical control unit 104, in accordance with the following formulae, updates the present position $X_a$, $Y_a$, $Z_a$, $B_a$, $C_a$ in a present position memory 108 every ΔT sec:

$$X_a \pm \Delta X \rightarrow X_a \tag{3a}$$

$$Y_a \pm \Delta Y \rightarrow Y_a \tag{3b}$$

$$Z_a \pm \Delta Z \rightarrow Z_a \tag{3c}$$

$$B_a \pm \Delta B \rightarrow B_a \tag{3d}$$

$$C_a \pm \Delta C \rightarrow C_a \tag{3e}$$

The sign depends upon the direction of movement. Similarly, in accordance with the following formulae, the numerical control unit 104 updates remaining travelling distances $X_r$, $Y_r$, $Z_r$, $B_r$, $C_r$ (the initial values of which are the incremental values $X_i$, $Y_i$, $Z_i$, $B_i$, $C_i$, respectively) every ΔT sec, with $X_r$, $Y_r$, $Z_r$, $B_r$, $C_r$ having been stored in a remaining travelling distance memory 109:

$$X_r - \Delta X \rightarrow X_r \tag{4a}$$

$$Y_r - \Delta Y \rightarrow Y_r \tag{4b}$$

$$Z_r - \Delta Z \rightarrow Z_r \tag{4c}$$

$$B_r - \Delta B \rightarrow B_r \tag{4d}$$

$$C_r - \Delta C \rightarrow C_r \tag{4e}$$

When the following condition is established:

$$X_r = Y_r = Z_r = B_r = C_r = 0 \tag{5}$$

the numerical control unit 104 causes the NC data reader 102 to read the next item of NC data.

If a pick-feed instruction M□□ is read out of the NC tape 101, the numerical control unit 104 immediately reads the next block of NC data and stores the data in the input memory 103. It should be noted that the NC data commanded following the pick-feed instruction are the position date Xn, Yn, Zn, Bn, Cn indicative of the machining starting point Ps of the second machining path PT2. These data are stored in the input memory 103.

Thereafter, a tool central axis vector arithmetic unit 110 responds to a calculation start signal from the numerical control unit 104 by obtaining, and storing in a vector memory 111, a tool central axis vector $\vec{V}a$ (ia, ja, ka) at the present position (the machining end point Pe on the first machining path PT1), and a tool central axis vector $\vec{V}n$ (in, jn, kn) at the machining starting point Ps on the second machining path PT2. Letting B represent the position of the tool in the direction of vertical rotation and C the position of the tool in the direction of horizontal rotation, the tool central axis vector (i, j, k) can be calculated from the equations.

$$i = \sin B \cdot \cos C \tag{6a}$$

$$j = \sin B \cdot \sin C \tag{6b}$$

$$k = \cos B \tag{6c}$$

Accordingly, the tool central axis vector arithmetic unit 110 is capable of obtaining the tool central axis vectors $\vec{V}a$, $\vec{V}n$ from Eqs. (6a) through 6(c) by using the positions (Ba, Bn) and (Ca, Cn) along the directions of vertical and horizontal rotation of the machining end point Pe and machining starting point Ps, which are stored in the present position memory 108 and input memory 103, respectively.

Next, an approach plane arithmetic unit 112 calculates a plane equation of the approach plane AP.

The plane equation of a plane PL which contacts the curve OLC, indicative of the external shape of the workpiece WK, at the machining starting point Ps (Xn, Yn, Zn) is given by $$in \cdot x + jn \cdot y + kn \cdot z = d \tag{7a}$$

where d is expressed by $$d = in \cdot Xn + jn \cdot Yn + kn \cdot Zn \tag{7b}$$

The reason for the foregoing is that the general equation of a plane is given by $$ax + by + cz = d$$

the vector $\vec{V}n$ of the normal to the plane PL is expressed by (in, jn, kn), and the plane PL contains the machining starting point Ps (Xn, Yn, Zn). It should be noted that Eq. (7a) can be derived because the vector of the normal to the plane PL is $\vec{V}n$, and that Eq. (7b) can be derived by making the substitutions x=Xn, y=Yn, z=Zn in Eq. (7a), which follows from the fact that the plane PL contains the machining starting point Ps.

When the plane PL has been found, the approach plane arithmetic unit 112 then calculates the point of intersection Pc' between the plane and the straight line SL' passing through the machining end point Pe and coinciding with the direction of the central axis of the tool.

Letting l represent the distance from the machining end point Pe to the point of intersection Pc', we have $$\vec{Pc'} = \vec{Pe} + l \cdot \vec{Va} \tag{8a}$$

where $\vec{Pc'}$, $\vec{Pe}$ are position vectors at the point of intersection Pc' and machining end point Pe, respectively. Since the point of intersection Pc' lies on the approach plane AP, the following will hold:

$$\vec{Vn} \cdot \vec{Pc'} = d \tag{8b}$$

where d has a value obtained from Eq. (7b). The equation $$\vec{Vn} \cdot (\vec{Pe} + l \cdot \vec{Vs}) = d \tag{8c}$$

holds from Eqs. (8a), (8b), and l is obtained from Eq. (8c). Substituting l into Eq. (8a) provides the position vector Pc' (Xc', Yc', Zc') of the point of intersection $\vec{Pc'}$. It should be noted that l may be written $$l = (d - \vec{Vn} \cdot \vec{Pe})/\vec{Vn} \cdot \vec{Va} = \frac{d - (in \cdot Xa + jn \cdot Ya + kn \cdot Za)}{in \cdot ia + jn \cdot ja + kn \cdot ka}$$

so that we may write $$Xc' = Xa + l \cdot ia \quad (8d)$$

$$Yc' = Ya + l \cdot ja$$

$$Zc' = Za + l \cdot ka$$

Thereafter, the approach plane arithmetic unit 112 determines whether the direction of the vector $\overrightarrow{PePc'}$ from the machining end point Pe to the point of intersection Pc' coincides with the direction of the tool central axis vector $\vec{Va}$. If coincidence is achieved, then a decision is rendered to the effect that the shape of the workpiece at the pick-feed portion is convex and processing, described below, is executed for the convex shape.

If non-coincidence is found to exist, then a decision is rendered to the effect that the shape of the workpiece at the pick-feed portion is concave and the approach plane arithmetic unit 112 performs processing, now to be described, to obtain the approach plane AP.

Since the approach plane AP for the case where the workpiece shape is concave lies parallel to the plane PL, as described in conjunction with FIG. 3(A), the plane is expressed by $$in \cdot x + jn \cdot y + kn \cdot z = d' \quad (9a)$$

Therefore, a plane equation of the approach plane can be obtained if d' is determined. Since the approach plane AP contains the machining end point Pe (Xa, Ya, Za), $$in \cdot Xa + jn \cdot Ya + kn \cdot Za = d' \quad (9b)$$

will hold. Accordingly, the approach plane AP is specified by Eqs. (9a), (9b).

Thereafter, an intersection arithmetic unit 113 calculates the three-dimensional positional coordinate values of the point of intersection Pc between the approach plane AP and the straight line SL passing through the machining starting point Ps and coinciding with the direction of the central axis of the tool. Letting l represent the distance from the machining starting point Ps to the point of intersection Pc, we have $$\overrightarrow{Pc} = \overrightarrow{Ps} + l \cdot \overrightarrow{Vn} \quad (10a)$$

where $\overrightarrow{Pc}$, $\overrightarrow{Ps}$ are position vectors at the point of intersection Pc and machining starting point Ps, respectively. Since the point of intersection Pc lies on the approach plane AP, the following will hold:

$$\overrightarrow{Vn} \cdot \overrightarrow{Pc} = d' \quad (10b)$$

where d' has a value obtained from Eq. (9b). The equation $$\overrightarrow{Vn} \cdot (\overrightarrow{Ps} + l \cdot \overrightarrow{Vn}) = d' \quad (10c)$$

holds from Eqs. (10a), (10b), and l is obtained from Eq. (10c). Substituting l into Eq. (10a) provides the position vector $\overrightarrow{Pc}$ (Xc, Yc, Zc) of the point of intersection Pc. It should be noted that l may be written $$l = (d' - \vec{Vn} \cdot \vec{Ps})/\vec{Vn} \cdot \vec{Vn} =$$

$$\frac{d' - (in \cdot Xn + jn \cdot Yn + kn \cdot Zn)}{in \cdot in + jn \cdot jn + kn \cdot kn}$$

so that we may write $$Xc = Xn + l \cdot in \quad (10d)$$

$$Yc = Yn + l \cdot jn$$

$$Zc = Zn + l \cdot kn$$

If the direction of the vector $\overrightarrow{PePc'}$ coincides with the direction of the tool central axis vector $\vec{Va}$ at the machining end point Pe, then a decision is rendered to the effect that the shape of the workpiece at the pick-feed portion is convex. Therefore, the approach plane arithmetic unit 112 considers the plane PL already found to be the approach plane AP and outputs the position vector $\overrightarrow{Pc'}$ of the already calculated point of intersection Pc' as the position vector $\overrightarrow{Pc}$.

When the point of intersection Pc is calculated and the three-dimensional coordinate values (Xc, Yc, Zc) of the point of intersection are applied thereto as inputs, the numerical control unit 104 calculates the incremental values Xi, Yi, Zi along the respective three-dimensional axes from the machining end point Pe to the point of intersection Pc from the equations $$Xc - Xa \rightarrow Xi$$

$$YC - Ya \rightarrow Yi$$

$$Zc - Za \rightarrow Zi$$

Thereafter, the calculations of Eqs. (1a)–(1c), (2a)–(2c) are performed as described above to obtain $\Delta X$, $\Delta Y$, $\Delta Z$, and these are applied to the pulse distributor 105 evert $\Delta T$ seconds. The numerical control unit 104 performs the calculations of Eqs. (3a)–(3c), (4a)–(4c) every $\Delta T$ seconds. When the condition $Xr = Yr = Zr = 0$ is established, namely when the tool arrives at the point of intersection Pc, the numerical control unit 104 performs the operations indicated by $$Bn - Ba \rightarrow Bi$$

$$Cn - Ca \rightarrow Ci$$

to calculate incremental values in the directions of vertical and horizontal rotation. Thereafter, the calculations of Eqs. (1d)–(1e), (2d)–(2e) are performed to obtain $\Delta B$, $\Delta C$, and these are applied as inputs to the pulse distributor 105 every $\Delta T$ seconds. The numerical control unit 104 performs the calculations of Eqs. (3d)–(3e), (4d)–(4e) every $\Delta T$ seconds. When the condition $$Br = Cr = 0$$

is established, the numeral control unit performs the operations indicated by $$Xn - Xa \rightarrow Xi$$
$$Yn - Ya \rightarrow Yi$$
$$Zn - Za \rightarrow Zi$$

to calculate incremental values Xi, Yi, Zi along the respective three-dimensional axes from the point of intersection Pc to the machining starting point Ps.

Then, in a similar manner, ΔX, ΔY, ΔZ are found and applied as inputs to the pulse distributor 105 every ΔT seconds. When the condition Xr=Yr=Zr=0 is established, the NC data reader 102 is caused to read the next block of NC data. The second path is subsequently machined by moving the tool along the second machining path on the basis of the NC data.

The curved surface will eventually be machined if the foregoing operations are repeated.

The foregoing is for a case where the position B in the direction of vertical rotation and the position C in the direction of horizontal rotation are entered from the NC tape as data specifying the direction of the central axis of the tool. However, the tool central axis vector $\vec{V}$ (i, j, k) may be given instead of B and C. In such case, however, it is necessary to obtain the positions B, C in the directions of vertical and horizontal rotation from the tool central axis vector using the following equations prior to performing the calculations of (1)–(1e):

$$B = \tan^{-1}\sqrt{(i^2 + j^2/k)}$$

$$C = \tan^{-1}(j/k)$$

In such case, the tool central axis vector arithmetic unit 110 is unnecessary [i.e., it is unnecessary to perform the calculations of Eqs. (6a)–(6c)].

Further, in the case described above, a pick-feed instruction is inserted into an NC program in advance, a pick-feed path is obtained automatically when the pick-feed instruction is read from the NC tape after the completion of machining along the first machining path, the tool is moved along the pick-feed path, and machining is subsequently performed along the second machining path. However, the present invention is not limited to such an arrangement. As an example, it can be arranged to enter data specifying a curved surface and data indicating a pick-feed, create NC data specifying a cutting path by using the curved surface data, obtain an NC tape by creating NC data for a pick-feed path through the above-described method on the basis of the data indicating the pick-feed, and machining the curved surface by loading the NC tape into an NC unit.

Furthermore, it can be arranged to prepare in advance a series of NC data comprising cutting path NC data for moving a tool along the first machining path, cutting path NC data for moving the tool along the second machining path, and a pick-feed instruction inserted between these two types of NC data; feed the data into an NC tape creating unit; obtain a pick-feed path through the above-described method based on the pick-feed instruction to create NC data specifying the pick-feed path; substitute these NC data for the pick-feed instruction; thereby to recreate an NC tape containing pick-feed path data in place of the pick-feed instruction; and machine the curved surface by loading the NC tape into an NC unit.

Figure 5:
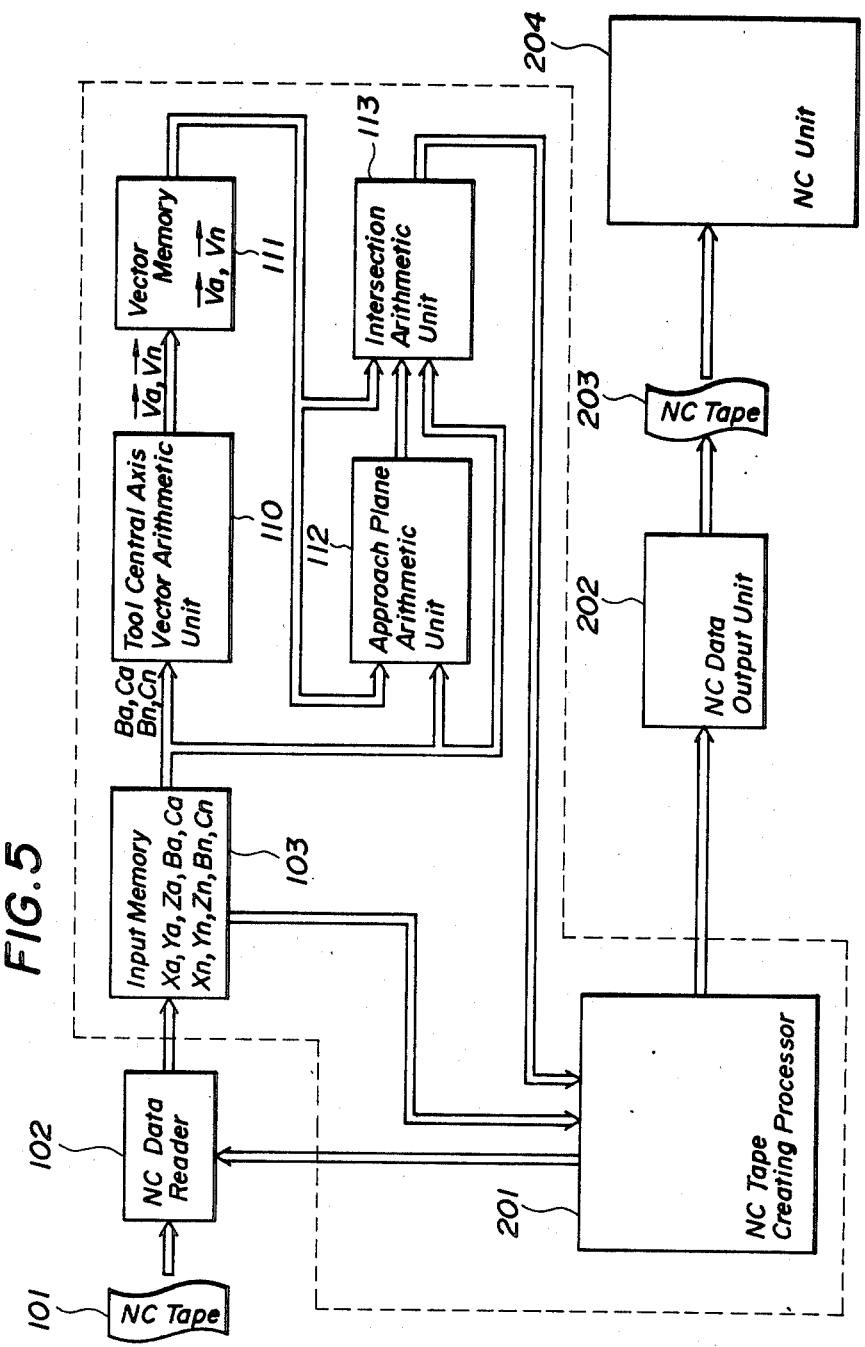
FIG. 5 is a block diagram of another embodiment of the present invention.

FIG. 5 is a block diagram of such an embodiment of the present invention. Portions similar to those shown in FIG. 4 are designated by like reference symbols. Stored in the NC tape or memory 101 are a number of NC data comprising NC data specifying tool movement along the first machining path, NC data specifying tool movement along the second machining path, and a pick-feed instruction inserted between these two types of data. It should be noted that the data specifying the paths need not necessarily be NC data but can be position data specifying the end points of very small straight lines when a curve is expressed as a polygonal approximation in the form of very small straight lines, as well as data specifying the direction of the central axis of the tool.

The NC data reader 102 reads NC data from the NC tape 101 one block at a time and stores the data in the input memory 103. Note that the input memory is designed to be capable of storing two blocks of path data. An NC tape creating processor 201 determines whether the present block of NC data stored in the input memory 103 is a pick-feed instruction. If it is not, the NC data are delivered as is to an NC data output unit (paper tape puncher, magnetic tape unit, etc.) 202, after which the NC data reader 102 is made to read the next block of NC data.

If the NC data stored in the input memory 103 are indicative of a pick-feed instruction, on the other hand, then the NC tape creating processor 201 causes the NC data reader 102 to read the next block of NC data, namely the three-dimensional position data Xn, Yn, Zn indicative of the machining starting point Ps on the second machining path, and the position data Bn, Cn in the directions of vertical and horizontal rotation, and to store these data in the input memory 103. Note that the three-dimensional position data Xa, Ya, Za indicative of the machining end point Pe on the first machining path and the position data Ba, Ca in the directions of vertical and horizontal rotation have also been stored in the input memory 103.

Thereafter, in response to a calculation start signal from the NC tape creating processor 201, the tool central axis vector arithmetic unit 110 obtains the tool central axis vector $\vec{Va}$ (ia, ja, ka) at the present position (machining end point Pe on the first machining path PT1) from Eqs. (6a)–(6c) by using the vertical rotation position Ba and horizontal rotation position Ca stored in the input memory 103, obtains the tool central axis vector $\vec{Vn}$ (in, jn, kn) at the machining starting point Ps from Eqs. (6a)–(6c) by using the vertical rotation position Bn and horizontal rotation position Cn at the machining starting point Ps stored in the input memory 103, and stores these vectors in the vector memory 111.

The approach plane arithmetic unit 112 and intersection arithmetic unit 113 then perform the above-described calculations to obtain three-dimensional coordinate values (Xc, Yc, Zc) of the point of intersection Pc. These are applied as inputs to the Nc tape creating processor 201.

When the three-dimensional coordinate values of the point of intersection Pc are applied, the NC tape creating processor 201 creates positioning data G01 XXc, YYc, ZZc;

for effecting positioning from the machining end point Pe to the point of intersection Pc. These data are delivered to the NC data output unit 202. Next, the NC tape creating processor 201 rotates the tool in the vertical and horizontal directions at the point of intersection Pc, creates rotation direction positioning data G01 BBn, CCn;

for bringing the tool central axis vector into coincidence therewith at the machining starting point Ps, and delivers these data to the NC data output unit 202.

Thereafter, the NC tape creating processor 201 creates positioning data

G01 XXn, YYn, ZZn;

for moving the tool linearly from the point of intersection Pc to the machining starting point Ps. These data are delivered to the NC data output unit 202. At the same time, the next block of NC data is read by the NC data reader 102, on the basis of which NC data the foregoing processing is repeated. In this manner, an NC tape 203 for creating the curved surface is created. Note that the NC data are assumed to be created in the form of absolute data.

The NC data stored on the NC tape 203 created through the foregoing processing are read by an NC unit 204, which proceeds to execute NC processing based on the read NC data. More specifically, a pick-feed is carried out after cutting is performed along the first machining path, cutting is implemented along the second machining path after the pick-feed, and the foregoing operations are subsequently repeated to machine the curved surface.

Figure 6:
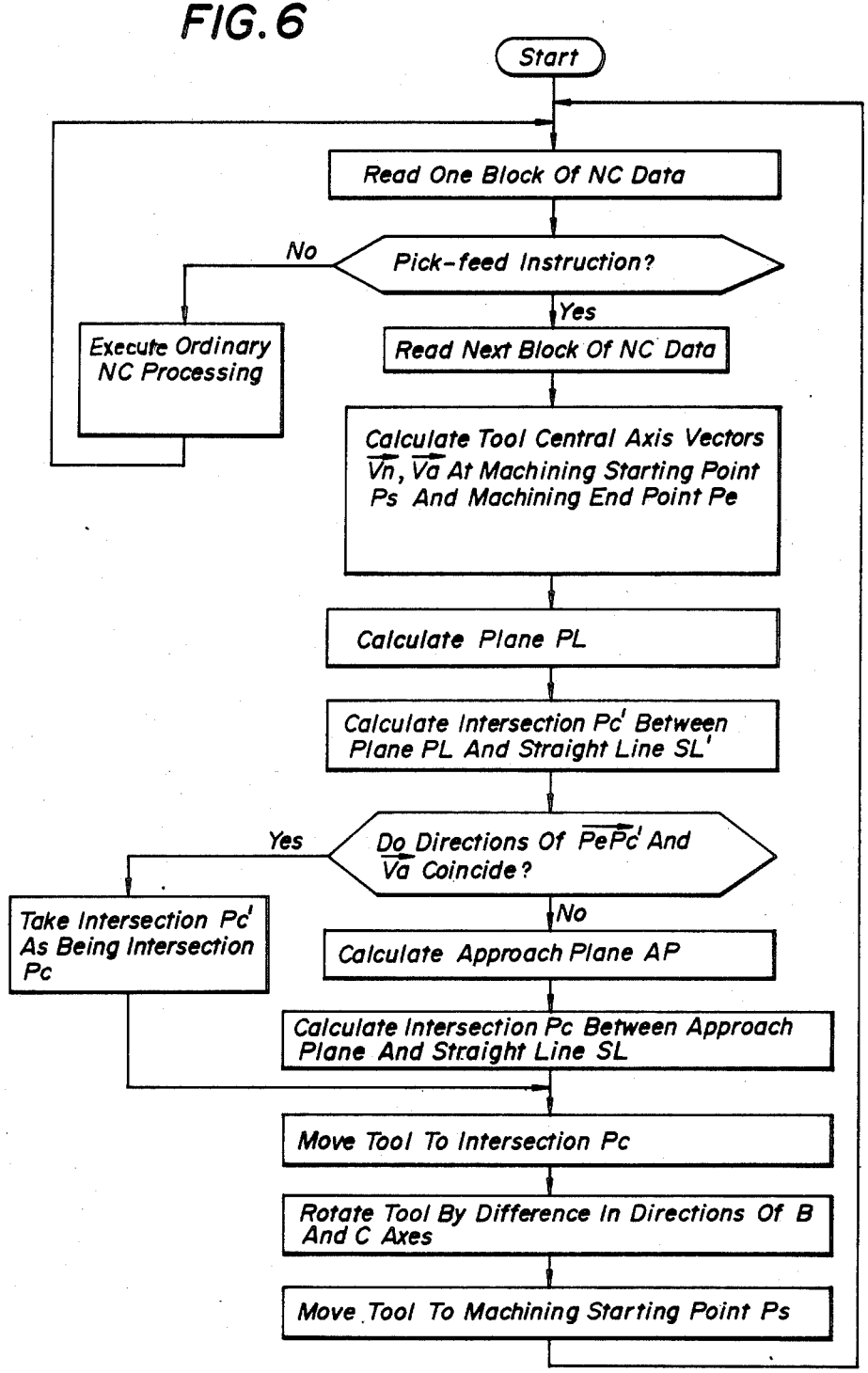
FIGS. 6 and 7 are flowcharts of processing for a case where the circuits of FIGS. 4 and 5 are constituted by a microcomputer, respectively.
Figure 7:
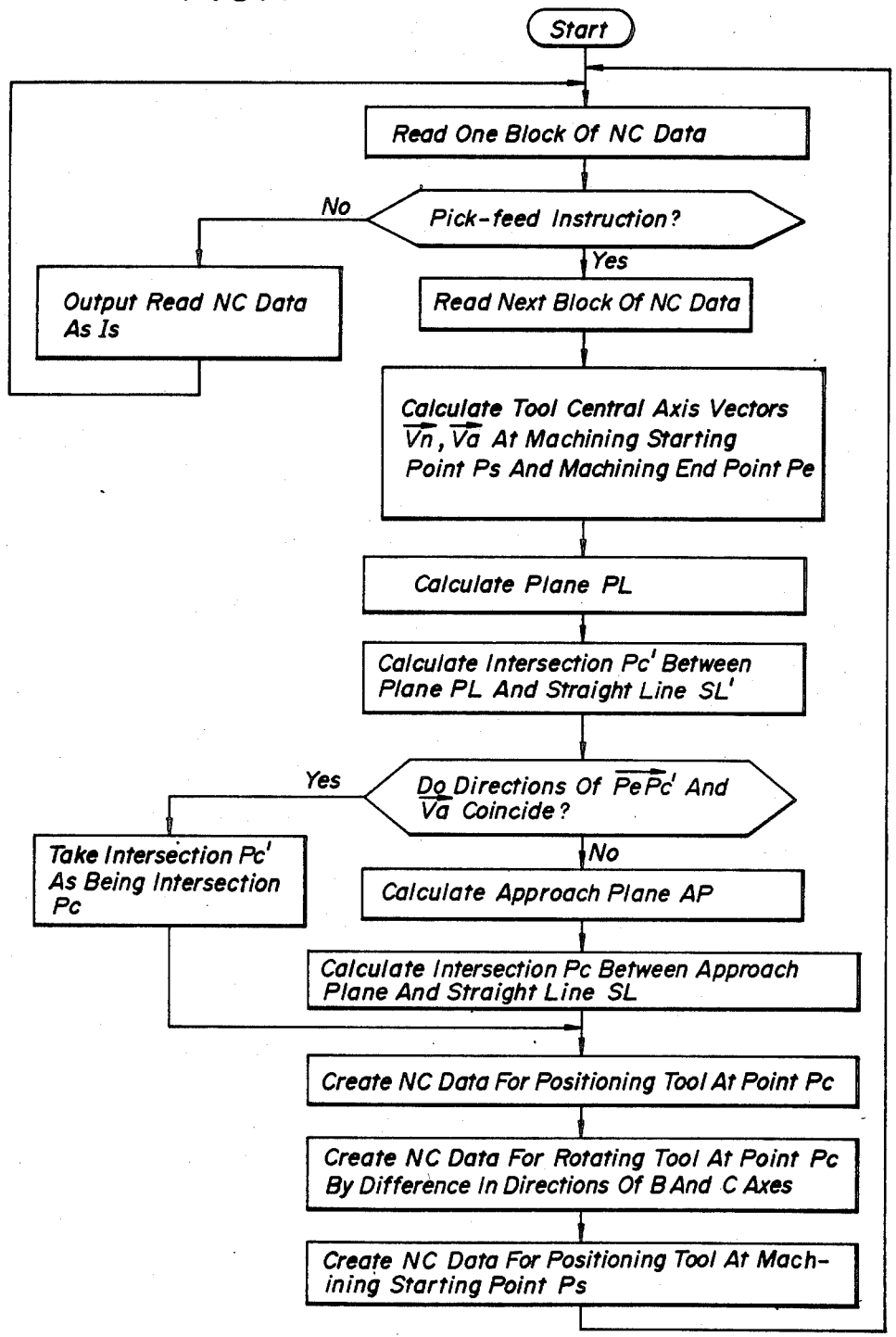

The circuitry enclosed by the dashed line in FIGS. 4 and 5 can be constituted by a microcomputer. In this case the flowcharts for the processing executed by the processors would be as shown in FIGS. 6 and 7, respectively. The present invention also is applicable to a case where the inner product of the tool central axis vectors at the first machining path end point and second machining path starting point, is positive.

According to the present invention as described above, a pick-feed can be obtained in a simple manner and a situation in which a tool strikes a workpiece when a pick-feed is performed can be eliminated. Moreover, the length of the pick-feed stroke can be reduced and machining time shortened. In addition, NC data can be created in a simple manner to perform processing for obtaining the pick-feed path and to pick-feed the tool along the path Pe→Pc→Ps.

What is claimed is:

1. A machining method for a machine tool having axes of rotation for performing a first machining operation by moving a tool relative to a workpiece in a first machining direction, thereafter pick-feeding the tool, performing a second machining operation after the pick-feed by moving the tool relative to the workpiece in a second machining direction opposite to that of the first machining direction, and repeating the first and second machining operations and the pick-feed operation to perform desired machining, comprising the steps of:
   (a) obtaining a plane contacting a curve along the external shape of the workpiece at a second machining starting point Ps at which the second machining operation is to begin, by using three-dimensional position data at the second machining starting point Ps of the second machining operation, and obtaining tool central axis direction data at the second machining starting point;
   (b) determining whether a curved surface of the workpiece in the proximity of a first machining end point Pe at the end of the first machining operation is concave or convex;
   (c) performing the following substeps if the curved surface of the workpiece is concave:
      (c1) obtaining an approach plane containing the machining end point Pe and lying parallel to the plane obtained in said step; and
      (c2) obtaining a point of intersection Pc between the approach plane and a straight line passing through the second machining starting point Ps of the second machining operation, the straight line coinciding with the direction of the central axis of the tool at the second machining starting point;
   (d) performing the following substeps if the curved surface of the workpiece is convex:
      (d1) adopting the plane obtained in said step (a) as an approach plane; and
      (d2) obtaining the point of intersection Pc between the approach plane and a straight line passing through the machining end point Pe and coinciding with the direction of the central axis of the tool by using three-dimensional position data at the machining end point Pe of the first machining operation, and tool central axis direction data at the machining end point;
   (e) moving the tool from the maching end point Pe toward the point of intersection Pc with a path from point Pe to point Pc to point Ps which serves as a pick-feed path;
   (f) performing a pick-feed by moving the tool from the point of intersection Pc to the second machining starting point Ps; and
   (g) executing the second machining operation.

2. A machining method for a machine tool according to claim 1, further comprising the step of orienting, at the point of intersection Pc, the central axis of the tool in a commanded direction at the machining starting point Ps.

3. A machining method for a machine tool according to claim 1, wherein said step (b) includes substeps of:
   (b1) obtaining a point at which the straight line coinciding with the direction of the central axis of the tool and passing through the machining end point Pe intersects the plane obtained in said step;
   (b2) determining whether the direction of a vector pointing from the machining end point Pe to the point obtained in said substep (b1) coincides with the direction of a vector of the central axis of the tool at the machining end point, the vector of the central axis of the tool being oriented outwardly from the curved surface of the workpiece; and
   (b3) rendering a decision to the effect that the curved surface of the workpiece is concave in case of non-coincidence and convex in case of coincidence.

4. A machining method for a machine tool according to claim 1, further comprising the step of creating NC data for moving the tool along the pick-feed path obtained, and wherein said step (f) comprises pick-feeding the tool on the basis of the created NC data.

5. A machining method for a machine tool according to claim 4, wherein said creating step comprises creating an NC program of path data for the first and second machining operations, and path data for pick-feeding the tool along the pick-feed path.

6. A machining method for a machine tool according to claim 1, further comprising the steps of inserting beforehand a pick-feed instruction between path data for the first machining operation and path data for the second machining operation, and generating the pick-feed path in response to the pick-feed instruction, wherein said step (f) comprises pick-feeding the tool along the pick-feed path.

* * * * *

UNITED STATES PATENT AND TRADEMARK OFFICE
CERTIFICATE OF CORRECTION

PATENT NO. : 4,689,750

DATED : AUGUST 25, 1987

INVENTOR(S) : HAJIMU KISHI ET AL.

It is certified that error appears in the above-identified patent and that said Letters Patent is hereby corrected as shown below:

Col. 5, line 6, "circuits," should be --circuits--;
      line 6, "shown)," should be --shown)--.

Col. 7, line 63, (Equation (10c)), "Vn" should be --$\vec{Vn}$--.

Col. 8, line 40, "evert" should be --every--.

Col. 9, line 44, after "to" insert a colon --:--.

Signed and Sealed this

Ninth Day of February, 1988

Attest:

DONALD J. QUIGG

*Attesting Officer*      *Commissioner of Patents and Trademarks*